US011010823B2

(12) United States Patent
Kludy et al.

(10) Patent No.: US 11,010,823 B2
(45) Date of Patent: May 18, 2021

(54) CONNECTOR LEASING FOR LONG-RUNNING SOFTWARE OPERATIONS

(71) Applicant: Citrix Systems, Inc., Fort Lauderdale, FL (US)

(72) Inventors: Thomas Kludy, Fort Lauderdale, FL (US); Ricardo F. Feijoo, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 314 days.

(21) Appl. No.: 15/663,186

(22) Filed: Jul. 28, 2017

(65) Prior Publication Data

US 2019/0035012 A1 Jan. 31, 2019

(51) Int. Cl.
*G06Q 30/06* (2012.01)
*G06F 9/50* (2006.01)
*G06Q 10/00* (2012.01)
*H04L 29/08* (2006.01)

(52) U.S. Cl.
CPC ....... *G06Q 30/0645* (2013.01); *G06F 9/5027* (2013.01); *G06Q 10/20* (2013.01); *H04L 67/10* (2013.01); *H04L 67/18* (2013.01)

(58) Field of Classification Search
None
See application file for complete search history.

(56) References Cited

U.S. PATENT DOCUMENTS

| | | | | |
|---|---|---|---|---|
| 8,606,922 B1* | 12/2013 | Greenfield | ............ | G06F 9/5027 709/226 |
| 9,032,400 B1* | 5/2015 | Thomas | ................ | G06F 11/008 718/1 |
| 9,037,703 B1 | 5/2015 | Wu et al. | | |
| 9,280,372 B2* | 3/2016 | Allen | ...................... | G06F 9/5027 |
| 9,294,558 B1* | 3/2016 | Vincent | .............. | H04L 67/1006 |
| 2008/0201459 A1* | 8/2008 | Vul | ........................ | H04L 43/00 709/223 |
| 2012/0254444 A1* | 10/2012 | Harchol-Balter | ......... | G06F 9/06 709/226 |

(Continued)

OTHER PUBLICATIONS

"Base band resource distribution under C-Ran" by Yanrong Niu, "International Journal on Smart Sensing & Intelligent Systems" (Mar. 2016).*

*Primary Examiner* — Neha Patel
*Assistant Examiner* — Clay C Lee
(74) *Attorney, Agent, or Firm* — Fox Rothschild LLP; Robert J. Sacco; Carol E. Thorstad-Forsyth

(57) ABSTRACT

Preventing certain types of service disruptions in a computing system involves receiving a lease request at a server of a cloud-based computing system, where the lease request originates from one of a plurality of cloud-hosted service computing systems (CSCS). The lease request will specify at least one suitable connector of a plurality of remote computing machines, where such connectors comprise an availability set at a computing resources location. In response to receiving the request, the server determines whether at least one of the connectors has pending maintenance operations. Based on such determination, the server will selectively grant the lease request by generating at least one electronic message directed to the CSCS which originated the lease request.

18 Claims, 6 Drawing Sheets

(56) References Cited

U.S. PATENT DOCUMENTS

| | | | |
|---|---|---|---|
| 2014/0108775 A1* | 4/2014 | Kludy | G06F 9/45558 713/2 |
| 2015/0067171 A1* | 3/2015 | Yum | H04L 67/2809 709/226 |
| 2015/0348177 A1* | 12/2015 | Craft | G06Q 30/0645 705/307 |
| 2016/0132806 A1* | 5/2016 | To | G06Q 10/06313 705/7.23 |
| 2017/0063615 A1* | 3/2017 | Yang | H04L 41/5054 |
| 2017/0149687 A1* | 5/2017 | Udupi | H04L 67/1002 |
| 2017/0199795 A1* | 7/2017 | Allen | G06F 9/4881 |
| 2018/0267830 A1* | 9/2018 | Rivera | G06F 9/45558 |

* cited by examiner

CONNECTOR LEASING FOR LONG-RUNNING SOFTWARE OPERATIONS

BACKGROUND

Statement of the Technical Field

The present disclosure relates generally to computing systems. More particularly, the present disclosure relates to implementing systems and methods which allow a long-running software operation to be scheduled for execution on a machine.

Description of the Related Art

As part of Citrix® Cloud, a customer deploys two or more connectors per resource location. Each connector is a Windows®-based machine. A resource location is a collection of related resources (including related machines) that a customer manages. The connector allows the cloud-hosted services in Citrix® Cloud to access the resources inside of the resource location. The connectors in a resource location are considered to be part of a single "availability set" (meaning, the connectors are able to provide full functionality without any outages, as long as no more than one connector in the resource location is offline at any point in time).

Citrix® Cloud coordinates maintenance activities across connectors in a way that ensures that any maintenance operation (defined as: any operation with a potential to cause a service disruption) happens on only a single connector at a time, and that maintenance operations do not happen on a connector while the connector is actively processing a task.

Citrix Cloud has some long-running operations that occasionally need to execute on each connector. Long-running operations may take up to 2 hours to complete. The connector cannot be interrupted during these operations, or the operations will fail, causing the product itself to fail. Usually the operations need to be completely cleaned up and restarted if they are terminated prematurely.

Also, as part of best practices of running a machine (any kind of machine), it is necessary to keep the machine patched and up to date with the latest software. Accordingly, Citrix Cloud needs to keep the connector up-to-date by distributing security patches and other updates in a timely manner to the connector. The updates can include installing operating system updates, performing remote reboots, and other maintenance operations deemed necessary by Citrix to ensure that the connector is running in a healthy state. Maintenance operations cause the connector to shut down, terminating its ability to execute operations, and terminating any operations in progress.

SUMMARY

Implementing systems and methods are described herein for preventing certain types of service disruptions in a computing system. The method involves receiving at an electronic processing circuit (e.g., a server) of a cloud-based computing system a lease request. The lease request will originate from at least one of a plurality of cloud-hosted service computing systems (CSCS) and will specify at least one suitable connector of a plurality of remote computing machines comprising connectors in an availability set at a computing resources location. The plurality of connectors facilitate for the plurality of CSCS access to resources within the computing resources location. In response to receiving the request, the server determines whether at least one of the connectors has pending maintenance operations. The pending maintenance operations can include various activities such as those involving security patches, installation of operating system updates, and/or performance of a remotely initiated reboot. Based at least in part on the determination as to whether at least one connector has a pending maintenance operation, the server will selectively grant the lease request by generating at least one electronic message directed to the CSCS which originated the lease request.

The lease request in some scenarios can specify a single suitable connector. In such a scenario, the method can involve operating the server so as to deny the lease request if the suitable connector has pending maintenance operations, or any connector in the computing resources location is currently in a maintenance mode.

The lease request in some scenarios will specify a plurality of suitable connectors. In that scenario, the server can determine whether all of the plurality of suitable connectors have at least one pending maintenance operation. If all of the plurality of suitable connectors have at least one pending maintenance operation, then the server can identify at least one of the plurality of suitable connectors with a longest remaining lease time. Thereafter, the server can grant the lease request with respect to the at least one of the plurality of suitable connectors which has the longest remaining lease time.

Alternatively, if at least one of the plurality of suitable connector does not have at least one pending maintenance operation, then the server can identify at least one of the plurality of suitable connectors with a shortest remaining lease time. Thereafter, the server can grant the lease request with respect to the at least one of the plurality of suitable connectors which has the shortest remaining lease time.

A lease request as described herein will specify at least one lease term indicating a duration of time during which the at least one CSCS seeks to utilize the at least one suitable connector. Further, if the lease request is granted, the server will update a connector lease end time data (e.g., based in part on the lease term information).

According to another aspect, this disclosure concerns a cloud-based computing system. The cloud based computing system comprises various elements including a computer processor (e.g. a computer server) which can include a non-transitory computer-readable storage medium. The non-transitory computer readable storage medium comprises programming instructions. These instructions are configured to cause the computer processor to implement a method for preventing service disruptions in the cloud-based computing system as described above. For example, a computer server can parse a lease request originating from at least one of a plurality of cloud-hosted service computing systems (CSCS). The lease request will specify at least one suitable connector of a plurality of remote computing machines comprising connectors which exist in an availability set at a computing resources location. The server is configured to determine whether at least one of the connectors has pending maintenance operations. Based at least in part on the determining operation, the server will selectively grant the lease request by generating at least one electronic message directed to the CSCS which originated the lease request.

BRIEF DESCRIPTION OF THE DRAWINGS

Embodiments will be described with reference to the following drawing figures, in which like numerals represent like items throughout the figures.

DETAILED DESCRIPTION

Figure 1:
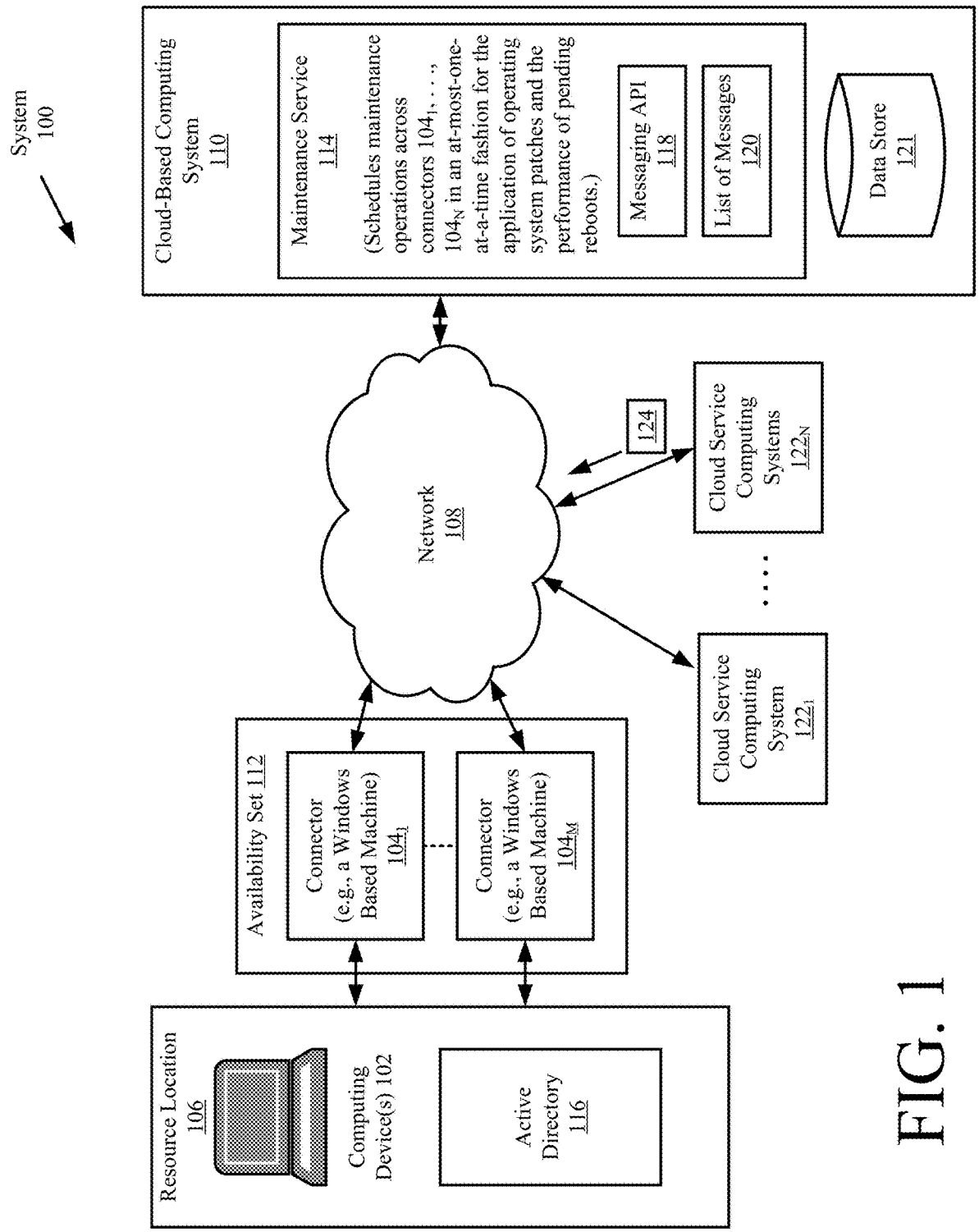
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The solution disclosed herein provides a way to allow a long-running operation to be scheduled for execution on a machine, ensuring the machine will not enter a maintenance window during the operation, while also ensuring that long-running operations will not starve the ability of the machine to enter a maintenance window in a reasonable amount of time. The solution offers several advantages. For example, it allows maintenance operations to be stalled on an instance during long-running operations. It also allows long-running operations to be scheduled across instances in a fair, load-balanced manner. A further advantage is that if facilitates scheduled maintenance operations with minimal delay even in presence of frequent, and overlapped, long-running operations.

Referring now to FIG. 1, there is provided an illustration of an exemplary system 100. System 100 is configured to use a maintenance service 114 hosted by a cloud-based computing system 110 to facilitate the coordination of certain maintenance services. For example, the maintenance service 114 can coordinate the application of software (e.g., Operating System (OS)) updates so that only a single connector $104_1, \ldots, 104_M$ in an availability set 112 will receive updates at the same time. In this way, updates (and corresponding temporary outages) are coordinated across independent connectors $104_1, \ldots, 104_M$ that act as part of an availability set 112. No two (2) connectors $104_1, \ldots, 104_M$ in the availability set 112 apply updates at the same time. The maintenance services required for each connector can be stored in a list of messages 120 which are stored in a memory location. In order to initiate the specified maintenance services, these messages can be communicated to each of the connectors at the appropriate time using messaging Application Programming Interface (API) 118. APIs are well known in the art, and therefore will not be described herein.

Connectors are well known in the art, and therefore will not be described in detail herein. However, it will be appreciated that in some scenarios, each connector $104_1, \ldots, 104_M$ is a Windows®-based machine (e.g., a server). Each connector $104_1, \ldots, 104_M$ is installed to facilitate the administration and control of resource locations from the cloud-based computing system 110. Accordingly, each connector $104_1, \ldots, 104_M$ serves as a channel for communication between the cloud-based computing system 110 and the resource location 106 enabling cloud management without requiring complex networking or infrastructure configurations. Each connector $104_1, \ldots, 104_M$ authenticates and encrypts all communication between the cloud-based computing system 110 and the resource location 106. During operations, each connector $104_1, \ldots, 104_M$ performs functions to enable: Active Directory ("AD") management; publishing from resources in the resource location 106; application and device management; user group management; and machine provisioning to the resource location 106.

As shown in FIG. 1, M connectors are deployed for a resource location 106. M is an integer value equal to or greater than two (2), i.e., two (2) or more connectors are deployed per resource location 106. Two or more connectors are employed to provide relatively high availability and relatively high throughput. It will be appreciated that a single connector cannot provide this capability. For example, if there is only one connector and it goes offline, then the connectivity with the cloud-based computing system 110 would be lost and the service would cease functioning.

The resource location 106 comprises a collection of resources that the customer (or company) manages. The resources can include, but are not limited to, computing device(s) 102 and/or an AD 116. Computing devices and ADs are well known in the art, and therefore will not be described herein. Any known or to be known computing device and/or AD can be used herein without limitation. For example, the computing device 102 includes, but is not limited to, a desktop computer, a personal computer, a personal digital assistant, a laptop computer, and/or a smart phone. The AD 116 includes, but is not limited to, a single-tenant AD (such as Microsoft® AD). The AD 116 provides identifying information for a customer's employees. The identifying information can include, but is not limited to, Security Identifiers ("SIDs").

A cloud-hosted maintenance service 114 (e.g., a Citrix Cloud service) 110 schedules maintenance operations across connectors $104_1, \ldots, 104_M$. The scheduling is performed in a way such that the maintenance operations occur in, at most, one machine at a time. The maintenance services are scheduled through the cloud-hosted maintenance service 114 rather than via the control of the OS (as is done in conventional systems).

Information concerning the status of such maintenance services in progress at each connector $104_1, \ldots, 104_M$ can be communicated to the cloud-hosted maintenance service 114 by messages generated by each of the connectors. For example, a connectors $104_1, \ldots, 104_M$ can communicate to the cloud-based maintenance service 114 when a maintenance operation is about to begin. The connector can also communicate to the cloud-based maintenance service 114 when such maintenance operations are completed. The handling of such messaging at the cloud-based maintenance service 114 is facilitated by messaging API 118. Information concerning the status of such maintenance activities can be parsed by the cloud-based messaging service 114 and then stored in a data store 121 which is accessible to the cloud-based maintenance service 114.

A plurality of Cloud Service Computing Systems (CSCS) $122_1, \ldots 122_N$ can require access to the computing resources which are provided at resource location 106, where N is an integer value equal to or greater than two (2). For example, in some scenarios, one or more of the plurality of CSCS $122_1, \ldots 122_N$ can comprise part of a Citrix® Cloud service which require access to the computing resources which are provided at resource location 106. In such a system the access required by each of the two (2) or more CSCS can potentially involve some long-running operations that need to execute on each connector $104_1, \ldots, 104_M$. These long-running operations may take up to 2 hours to complete.

It is important that the connector $104_1, \ldots, 104_M$ not be interrupted during these long-running operations, or such operations will fail, causing the cloud-hosted product itself to fail. Usually the types of long-running operations described herein need to be completely cleaned up and restarted if they are terminated prematurely. Notably, maintenance operations initiated by a cloud-hosted maintenance service 114 can cause the connector to shut down. Accordingly, the initiation of such maintenance services can terminate the ability of the connector $104_1, \ldots, 104_M$ to execute the various types of long-running operations which may be requested by a CSCS $122_1, \ldots 122_N$, including any such long-running operations which may be already in progress. To avoid these and other problems, a cloud-hosted maintenance service 114 can perform certain connector control operations as described herein.

Figure 2:
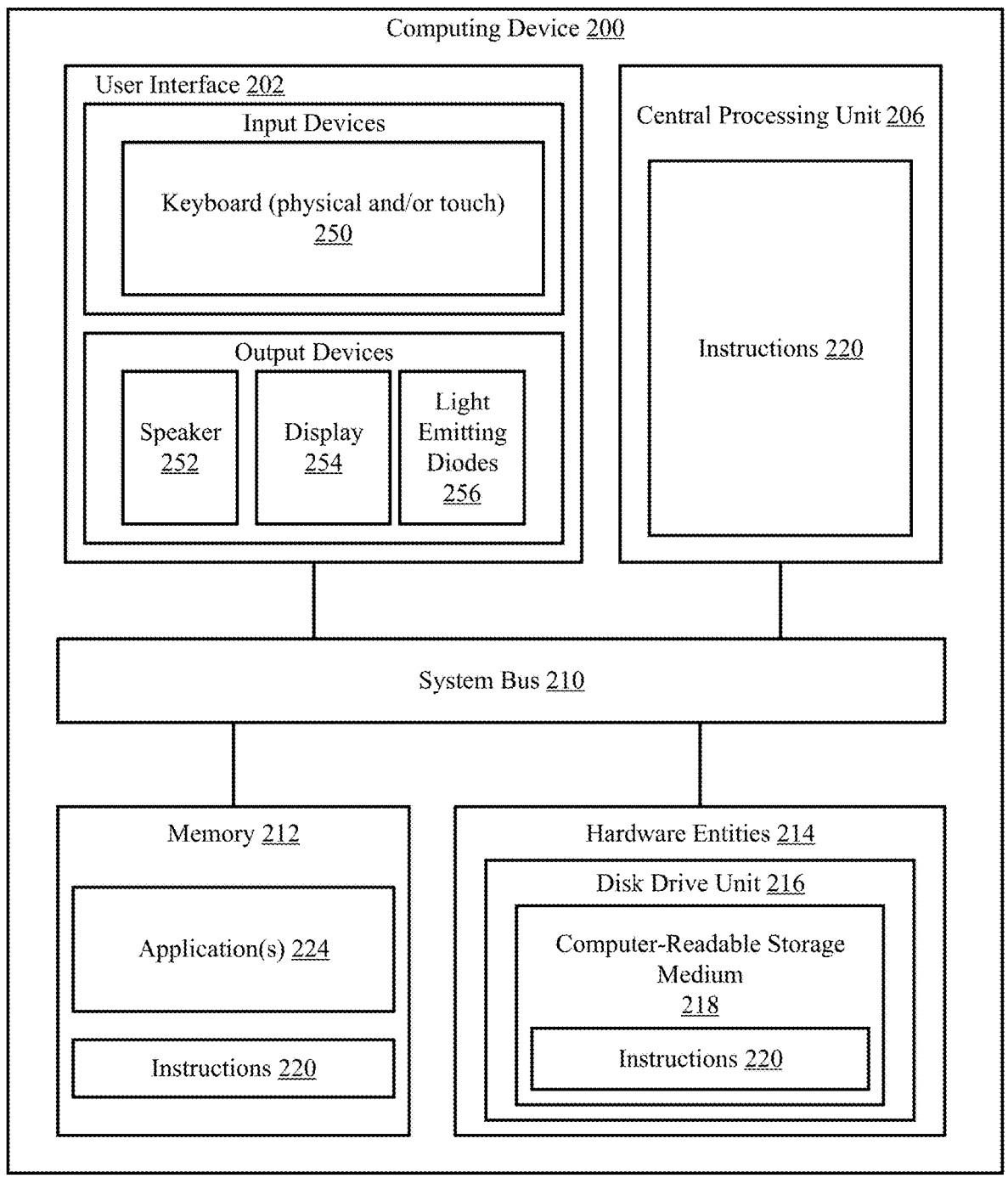
FIG. 2 is an illustration of an exemplary architecture for a computing device.

Referring now to FIG. 2, there is provided an illustration of an exemplary computing device 200 hosting a maintenance service (e.g., maintenance service 114 of FIG. 1). In this regard, the computing device 200 is part of a cloud-based computing system (e.g., cloud-based computing system 110 of FIG. 1). The cloud-based computing system can include a plurality of servers arranged in a distributed fashion. Each server is the same as or substantially similar to computing device 200.

Notably, the connectors $104_1, \ldots, 104_M$ of FIG. 1 can have the same or similar architecture as that shown in FIG. 2. As such, the description of FIG. 2 is also suitable for understanding the hardware and/or software architectures of the connectors of FIG. 1. As noted above, the connectors $104_1, \ldots, 104_M$ of FIG. 1 can include, but are not limited to, machines (or computing devices) running a Windows OS (e.g., a personal computer or server). Such machines (or computing devices) are well known in the art, and will not be described in detail herein. Still, it should be understood that such machines are modified to implement all or a portion of the methods described herein. Such modifications can include software modifications, hardware modification or a combination of both.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to enable the prevention of service disruptions during operating system updates as described herein. As such, the computing device 200 of FIG. 2 implements at least a portion of the method(s) described herein.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices and output devices, which facilitate user-software interactions for controlling operations of the computing device 200. The input devices include, but are not limited, a physical and/or touch keyboard 250. The input devices can be connected to the computing device 200 via a wired or wireless connection (e.g., a Bluetooth® connection). The output devices include, but are not limited to, a speaker 252, a display 254, and/or light emitting diodes 256.

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the computing device 200 and that cause the computing device 200 to perform any one or more of the methodologies of the present disclosure.

In some scenarios, the hardware entities 214 include an electronic circuit (e.g., a processor) programmed for facilitating the prevention of service disruptions during operating system updates. In this regard, it should be understood that the electronic circuit can access and run application(s) 224 installed on the computing device 200. The functions of the software application(s) 224 are apparent from the following discussion of the present solution. For example, the software application is configured to perform one or more of the operations described below in relation to FIG. 3.

In a scenario in which a CSCS $122_1, \ldots 122_N$ has a long-running operation which needs to be performed on a connector $104_1, \ldots, 104_M$, the CSCS $122_1, \ldots 122_N$ will initiate a lease request 124 and communicate same to the cloud-hosted maintenance service 114. As used herein, a lease request with respect to a connector should be understood as a negotiated agreement between the cloud-based maintenance service 114 and a CSCS $122_1, \ldots 122_N$ to make available a requested connector, based on certain lease terms presented by the CSCS. These lease terms will generally be specified as part of a lease request, which is described below in greater detail. At a minimum, the lease request will specify one or more such connectors which are deemed suitable for carrying out the required computing operations, and an availability period during which the CSCS is requesting that such hardware and software resources are made available.

Referring now to FIG. 3, a process for connector leasing can be begin at 302 and continue at 304 where the cloud-hosted maintenance service 114 will receive the lease request 124 from a CSCS $122_1, \ldots 122_N$. The handling of the lease request messaging is facilitated at maintenance service 114 by messaging API 118. According to one aspect, the lease request will specify certain request information (i.e., lease terms), such as the identity of one or more connectors $104_1, \ldots, 104_M$ that are suitable for performing the computing operation. The lease request 124 will also advantageously specify an estimated duration of time which is necessary for completion of the long-running operation (i.e., a requested duration of the lease). For example, in the lease request 124 the CSCS $122_1, \ldots 122_N$ can ask for any period of time from 5 minutes up to 2 hours. The maintenance service 114 will parse the lease request 124 to extract the request information contained therein. Such information can then be stored in a memory location (e.g., data store 121) associated with the maintenance service 114.

Once the lease request information has been extracted from the lease request message, the cloud-hosted maintenance service 114 will examine the list of connectors $104_1, \ldots, 104_M$ which are specified in the request as suitable. Thereafter, at 306 the maintenance service 114 will determine which one(s) of such suitable connectors have pending maintenance operations. In some scenarios, this process can involve examination of the list of maintenance messages which are stored in the list of messages 120. In other scenarios, a list of pending maintenance operations can be stored as part of a databases contained in data store 121. Examples of such maintenance operations as described herein can include security patches, installation of operating system updates, performance of remotely initiated reboots, and/or other maintenance operations deemed necessary by the cloud services provider to ensure that the connector is running in a healthy state.

Thereafter, the process continues to 308 where a determination is made as to whether only a single suitable connector has been identified in the lease request. If so (308: Yes), the process continues to 312. At 312 a determination is made as to whether the single suitable connector which has been specified has any pending maintenance operations. If not (312: No) then the process continues on to 314 where a determination is made as to whether there is any connector $104_1, \ldots, 104_M$ in the same resource location 106 as the single specified connector that is currently in maintenance mode. In other words, at 314 the cloud-hosted maintenance service 114 will examine the status of connectors which were not identified as being suitable, and will determine whether any are currently involved with performing software maintenance operations.

If the connector $104_1, \ldots, 104_M$ specified as suitable does have pending maintenance operations (312: Yes), or if any other connector in the same resource location is currently in maintenance mode (314: Yes) then the lease request from the CSCS is denied at 315. More particularly, the denial of such lease request can be facilitated by using the messaging API 118 to communicate a message to the CSCS $122_1, \ldots 122_N$ from which the lease request originated. The effect of the process described in 312-316 is that a caller cannot continuously lease a connector $104_1, \ldots, 104_M$ while maintenance operations need to be performed.

If the connector specified as suitable does not have pending maintenance operations (312: No), and if there are no connectors in the same resource location currently in maintenance mode (314: No) then the process will continue on to 316 where the lease request is granted. More particularly, at 316 the cloud-hosted maintenance service 114 will grant the lease request to the CSCS $122_1, \ldots 122_N$ from which the lease request originated. Granting of such lease request will include sending a message to the CSCS $122_1, \ldots 122_N$ from which the lease request 124 originated.

If a lease is granted at 316, the connector lease end-time data is updated in the cloud hosted maintenance service at 318. Such lease end-time data can be stored in data store in 121. At this point in the process, the connector $104_1, \ldots, 104_M$ which was leased is returned to the CSCS $122_1, \ldots 122_N$ so that the connector can carry out the requested operations. The CSCS which initiated the lease request can then be assured that no maintenance operations will execute on the connector during the lease period. Consequently, it is ensured that the connector will be allowed to complete the long-running operations without interruption.

Referring once again to FIG. 3A, there are some lease requests from a CSCS $122_1, \ldots 122_N$ which will specify more than one suitable connector for carrying out the requested long-running operations (308: No). In such scenarios, the process will continue to 310 where a determination is made as to whether all of the suitable connector have pending maintenance operations. If so, the process continues to step 330 in FIG. 3C, where the maintenance server 114 will identify (from among the list of suitable connectors specified in the lease request), at least one connector with a longest remaining lease time. At 332, a determination is made as to whether there is more than one connector with the longest remaining lease time (e.g., two connectors which have the same longest lease time so as to create a tie). If so (332: Yes), then maintenance server 114 will randomly select at 334 one connector for the lease assignment (from among the suitable connectors) having the longest remaining lease times. Otherwise (332: No), the connector with the longest remaining lease time is simply selected for lease assignment at 336.

Once a suitable connector has been selected for lease assignment at 334 or 336, the maintenance server will actually grant the lease request for the selected connector at 338. Granting the lease request can involve messaging the CSCS that initiated the lease request with information specifying that the requested lease has been granted. Such messaging operations can be facilitated by means of messaging API 118. After a connector lease has been granted (or concurrently therewith) the maintenance server 114 will update the lease end-time for the leased connector. The lease end-time information can be stored in a data store (e.g. data store 121). For example, assume that a connector currently has twenty minutes of lease time remaining from a previously lease request so that its lease end time is 9:00 A.M. If the new lease request which has been granted seeks a lease time of 30 minutes, then the updated lease-end time for that particular connector will be 9:30 A.M.

Figure 3A:
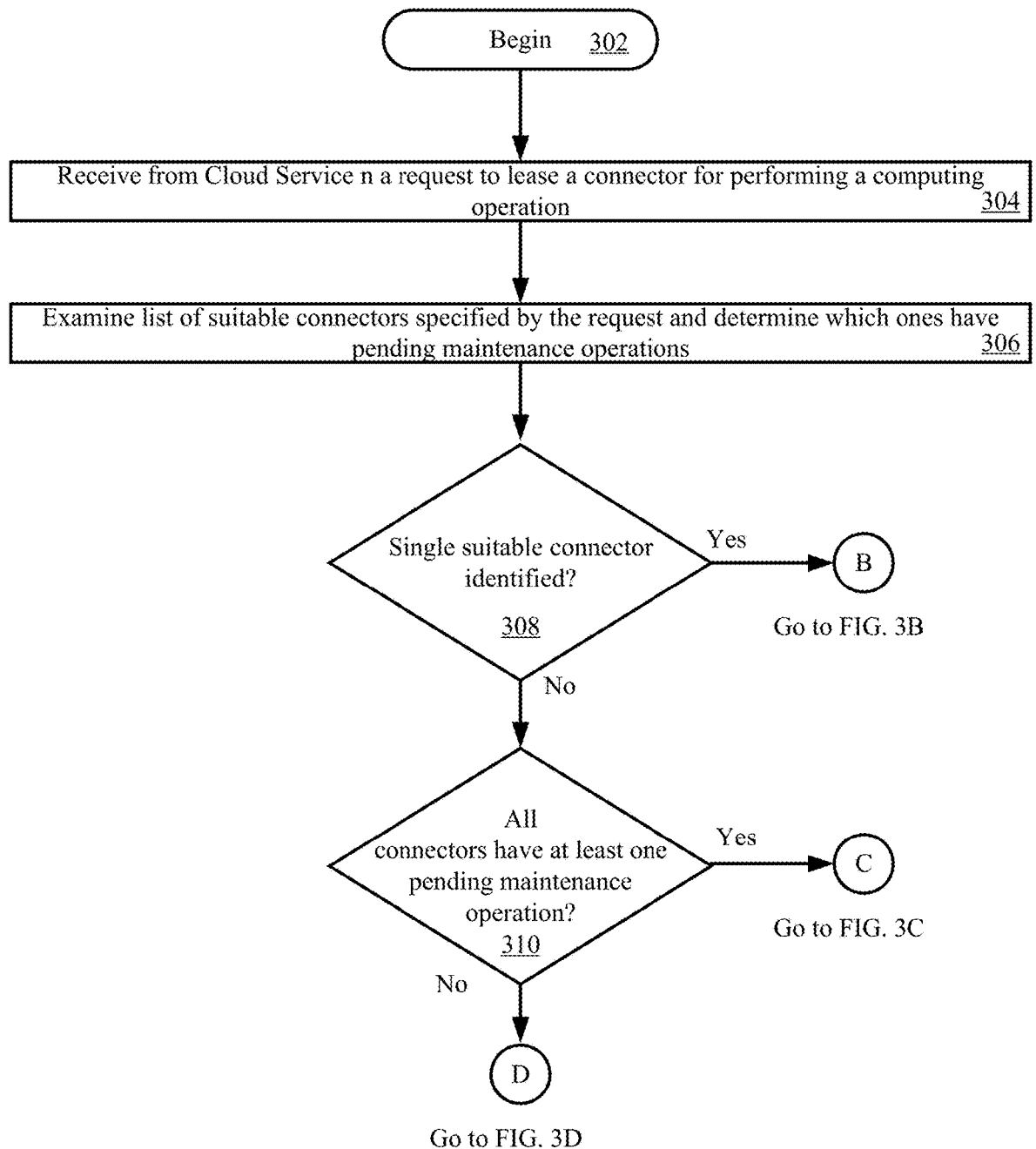
FIGS. 3A-3D (collectively referred to herein as "FIG. 3") is a flow diagram of an exemplary method for leasing connectors to facilitate long-running software operations.
Figure 3B:
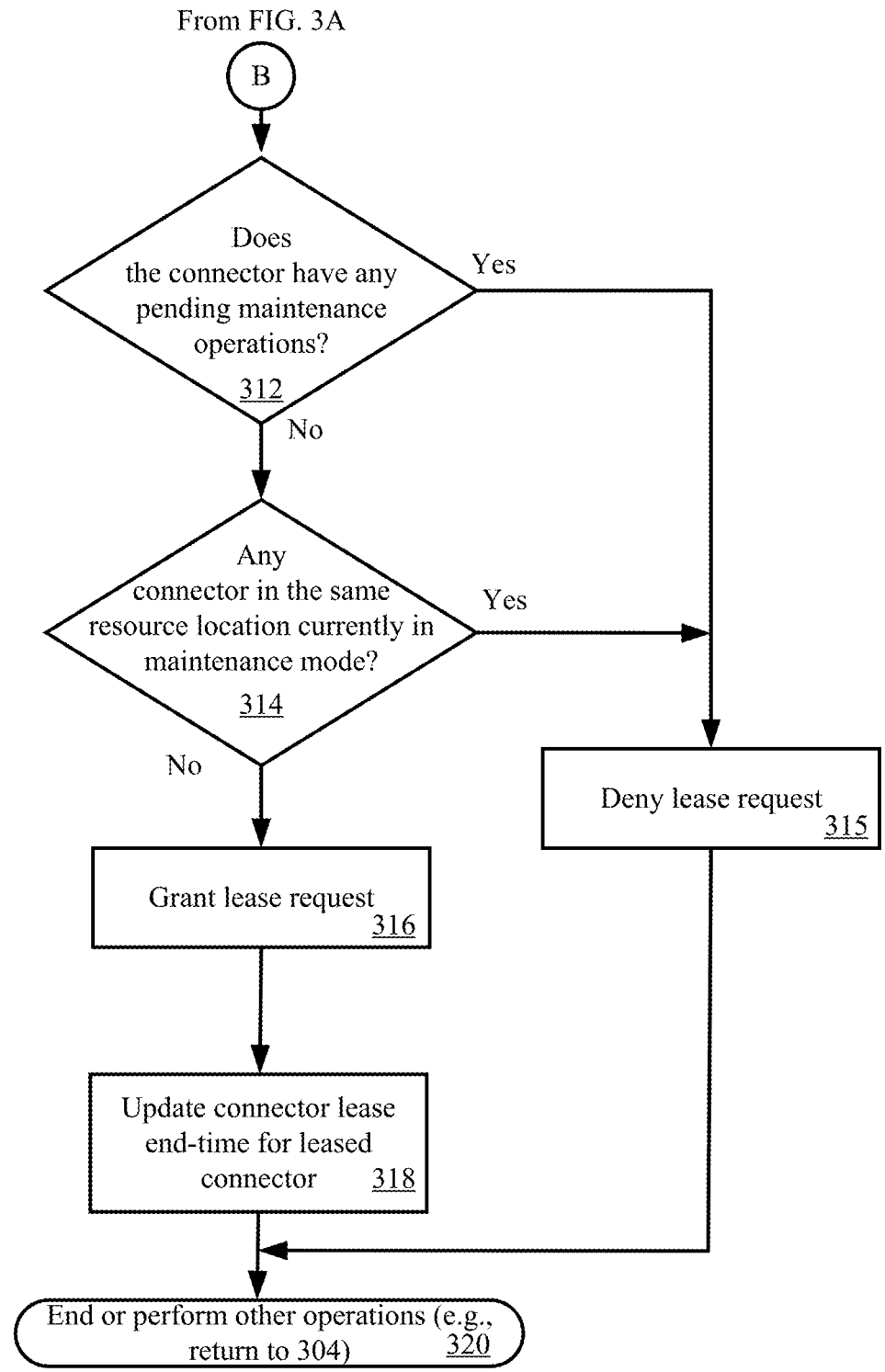
Figure 3C:
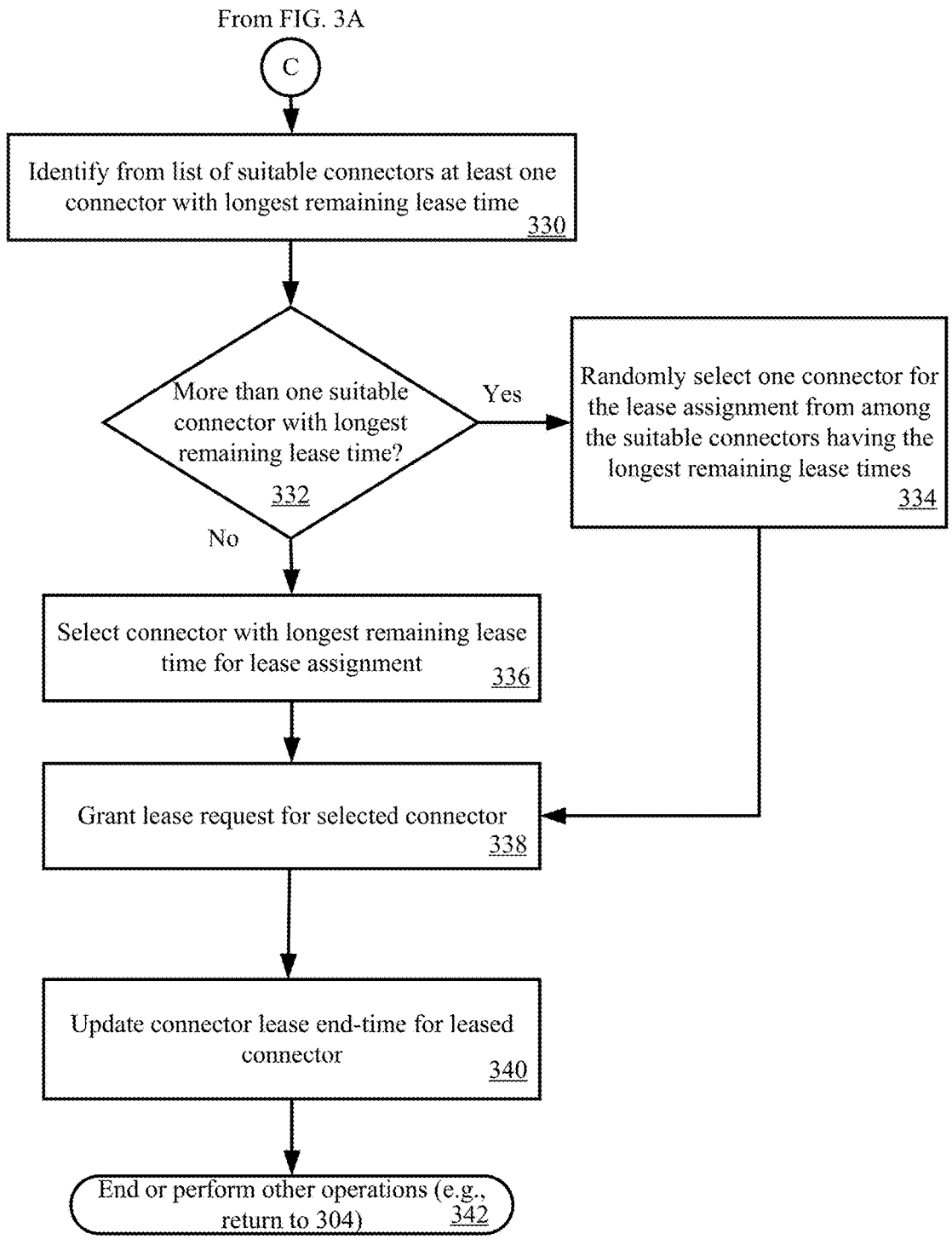

The effect of the process in FIG. 3C is that, during the time period when all connectors $104_1, \ldots, 104_M$ are awaiting maintenance, all lease requests will be granted with respect to a single connector. This allows the long-running operations to complete on all other connectors in the minimum amount of time.

Referring once again to FIG. 3A, if all connectors $104_1, \ldots, 104_M$ do not have at least one pending maintenance operation (310: No) then the process continues on to 350 in FIG. 3D. At 350 the maintenance server 114 will identify (from list of suitable connectors specified in the lease request) at least one connector with shortest remaining lease time. At 352, a determination is made as to whether there is more than one connector with the shortest remaining lease time (e.g., two connectors which have the same shortest remaining lease time so as to create a tie). If so (352: Yes), then maintenance server 114 will randomly select at 354 one connector for the lease assignment from among the suitable connectors having the shortest remaining lease times. Otherwise (352: No), the connector with the shortest remaining lease time is simply selected for lease assignment at 356.

Once a suitable connector has been selected for lease assignment at 354 or 356, the maintenance server 114 will grant the lease request for the selected connector at 358. After a connector lease has been granted (or concurrently therewith) the maintenance server 114 will update the lease end-time for the leased connector.

Figure 3D:
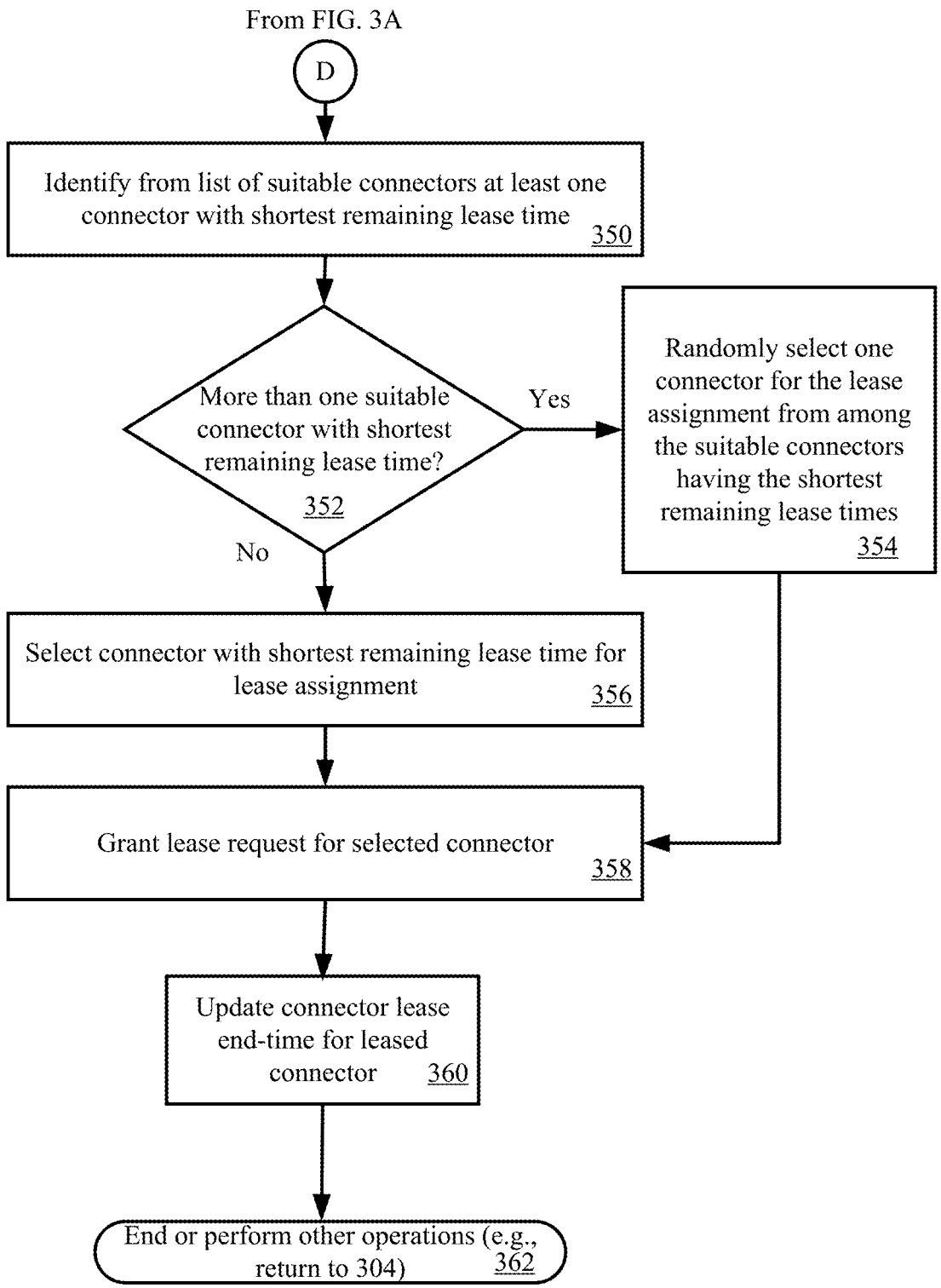

The effect of the process steps described in FIG. 3D is that the lease requests directed to any of connectors $104_1, \ldots, 104_M$ will be automatically load balanced by the maintenance server 114 between and among such connectors. Each time a connector lease is granted on a specific connector, that same connector is much less likely (due to its updated lease end date) to be chosen for the next lease request.

The solution presented herein provides a way to allow a long-running operation to be scheduled for execution on a machine, ensuring the machine will not enter a maintenance window during the operation, while also ensuring that long-running operations will not starve the ability of the machine to enter a maintenance window in a reasonable amount of time.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for managing computing resources in a system, comprising:

by a cloud-based computing system:

performing scheduled maintenance operations across a plurality of connectors in an availability set for a computing resources location wherein each connector is a channel for communications between the cloud-based computing system and the computing resources location and further providing administration and control of the computing resources location by the cloud-based computing system, the cloud-based computing system conducting at a given time a maintenance operation on only one connector of the plurality of connectors in the availability set by transitioning a connector undergoing maintenance from an online state to an offline state;

providing with the plurality of connectors access to the computing resources location by a plurality of cloud-hosted service computing systems (CSCSs);

receiving, while performing the scheduled maintenance operations, a lease request originating from at least one CSCS of the plurality of CSCSs, the lease request specifying at least one connector of the plurality of connectors for performing specified software operations and a lease duration;

determining, while performing the scheduled maintenance operations, whether the at least one connector has scheduled pending maintenance operations;

determining whether any of the connectors in the availability set is currently performing respective ones of the scheduled maintenance operations;

selectively granting the lease request by generating at least one electronic message directed to the CSCS which originated the lease request, based on a determination that the at least one connector does not have scheduled pending maintenance operations and a determination that, none of the connectors is currently performing respective ones of the maintenance operations; and stalling at least one respective scheduled maintenance operation on the at least one connector being leased during the lease duration and maintaining access between the at least one CSCS associated with the lease request to the resources within the computing resources location as the specified software operations are performed.

2. The method according to claim 1, wherein the lease duration specifies a duration of time during which the at least one CSCS seeks to utilize the at least one connector, and further comprising updating a connector lease end time data based on the lease request being granted.

3. The method according to claim 1, wherein the lease request specifies a single connector, and further comprising, by the cloud-based computing system, denying the lease request based on a determination that the single connector has the scheduled pending maintenance operations.

4. The method according to claim 1, wherein the lease request specifies a set of connectors, and further comprising, by the cloud-based computing system, determining whether all connectors of the set of connectors have at least one pending maintenance operation.

5. The method according to claim 4, further comprising, by the cloud-based computing system, identifying at least one connector of the set of connectors with a longest remaining lease time if all connectors of the set of connectors have at least one pending maintenance operation.

6. The method according to claim 5, further comprising, by the cloud-based computing system, granting the lease request with respect to the at least one connector of the set of connectors which has the longest remaining lease time.

7. The method according to claim 4, further comprising, by the cloud-based computing system, identifying at least one connector of the set of connectors with a shortest remaining lease time if at least one connector of the set of connectors does not have at least one pending maintenance operation.

8. The method according to claim 7, further comprising, by the cloud-based computing system, granting the lease request with respect to the at least one connector of the set of connectors which has the shortest remaining lease time.

9. The method according to claim 1, wherein the scheduled maintenance operations are selected from the group consisting of security patches, installation of operating system updates, and performance of a remotely initiated reboot.

10. A cloud-based computing system, comprising:
a processor comprised of an electronic circuit; and
a non-transitory computer-readable storage medium comprising programming instructions that are configured to cause the processor to implement a method for preventing service disruptions in a system, wherein the programming instructions comprise instructions to:
schedule maintenance operations across a plurality of connectors in an availability set for a computing resources location wherein each connector is a channel for communications between the cloud-based computing system and the computing resources location and further provides administration and control of the computing resources location by the cloud-based computing system;
perform the scheduled maintenance operations such that an operational state of only one connector of the plurality of connectors is transitioned from an online state to an offline state at any given time;
parse a lease request originating from at least one cloud-hosted service computing system (CSCS) of a plurality of cloud-hosted service computing systems (CSCSs), the lease request specifying at least one connector of the plurality of connectors and performing specified software operations and a lease duration;
determine whether the at least one connector has scheduled pending maintenance operations;
determine whether any of the connectors is currently performing respective ones of the maintenance operations;
selectively grant the lease request by generating at least one electronic message directed to the CSCS which originated the lease request, based on a determination that the at least one connector does not have scheduled pending maintenance operations and based on a determination that none of the connectors is currently performing respective ones of the maintenance operations; and
stall at least one respective scheduled maintenance operation on the at least one connector being leased during the lease duration to maintain access between the at least one CSCS associated with the lease request to the resources within the computing resources location as the specified software operations are performed.

11. The cloud-based computing system according to claim 10, wherein the lease duration indicating a duration of time during which the at least one CSCS seeks to utilize the at least one connector, and wherein the processor is further configured to update a lease end time data based on the lease request being granted.

12. The cloud-based computing system according to claim 10, wherein the lease request is comprised of data which specifies a single connector, and the processor is further configured to deny the lease request based on a determination that the single connector has the pending maintenance operations.

13. The cloud-based computing system according to claim 10, wherein the lease request comprises data which specifies a set of connectors-s, and wherein the processor is further configured to determine whether all connectors of the set of connectors have at least one pending maintenance operation.

14. The cloud-based computing system according to claim 13, wherein the processor is configured to identify at least one connector of the set of connectors with a longest remaining lease time based on determining all connectors of the set of connectors have at least one pending maintenance operation.

15. The cloud-based computing system according to claim 14, wherein the processor is configured to grant the lease request with respect to the at least one connector of the set of connectors which has the longest remaining lease time.

16. The cloud-based computing system according to claim 13, wherein the processor is configured to identify at least one connector of the set of connectors with a shortest remaining lease time based on at least one connector of the set of connectors does not have at least one pending maintenance operation.

17. The cloud-based computing system according to claim 16, wherein the processor is further configured to grant the lease request with respect to the at least one connector of the set of connectors which has the shortest remaining lease time.

18. The cloud-based computing system according to claim 10, wherein the scheduled maintenance operations comprise at least one selected from the group consisting of security patches, installation of operating system updates, and performance of a remotely initiated reboot.

* * * * *